Oct. 19, 1943. S. GOLD 2,332,216
WHEEL-CONTROL STRUCTURE FOR EDUCATIONAL AIRPLANE COCKPIT OUTFIT
Original Filed Oct. 30, 1942 2 Sheets-Sheet 1

INVENTOR
Sam Gold
BY
Bluck + Reitinfeld
ATTORNEYS

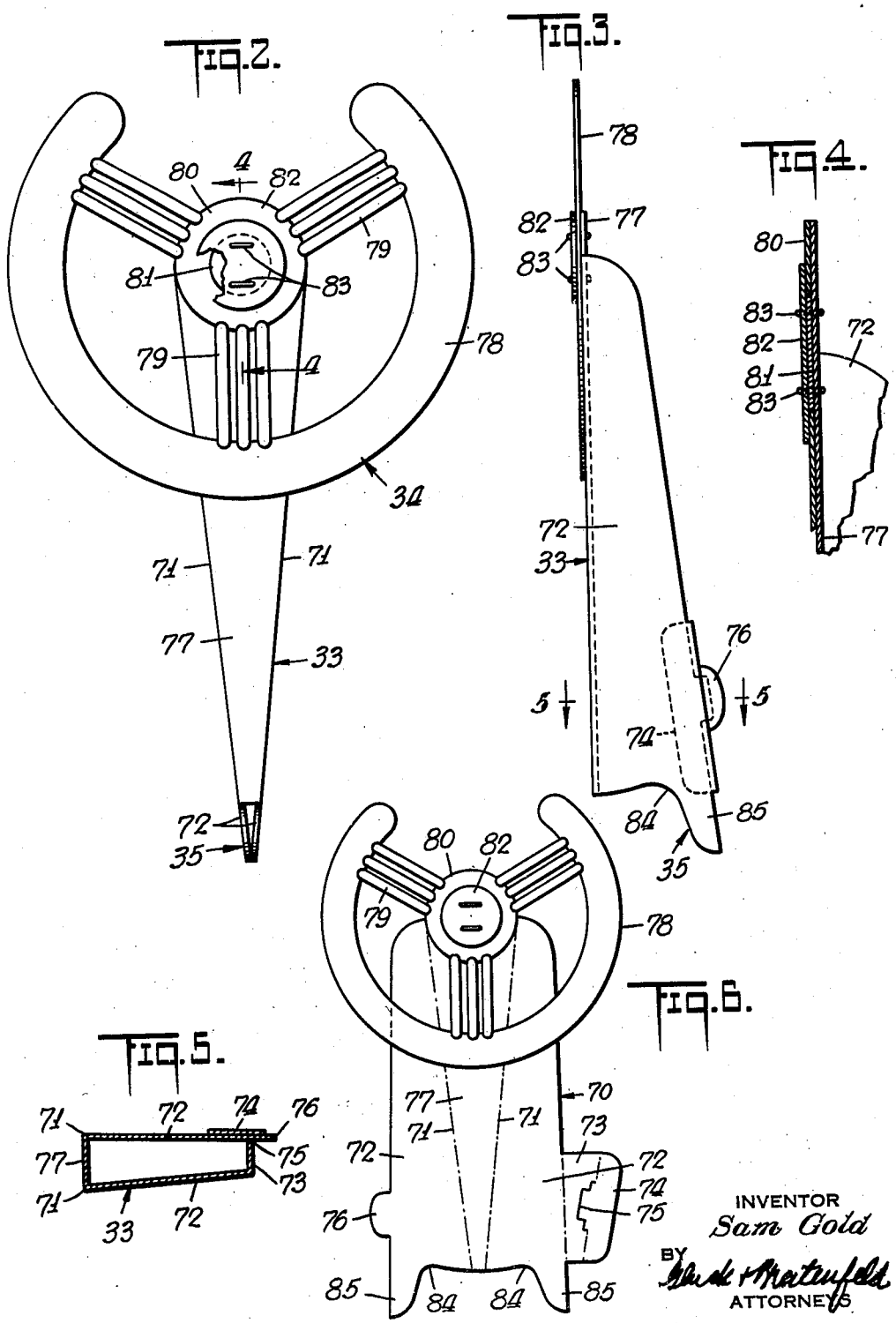

Patented Oct. 19, 1943

2,332,216

UNITED STATES PATENT OFFICE 2,332,216

WHEEL-CONTROL STRUCTURE FOR EDUCATIONAL AIRPLANE-COCKPIT OUTFITS

Sam Gold, Chicago, Ill., assignor to Einson-Freeman Co., Inc., Long Island City, N. Y., a corporation of Delaware Original application October 30, 1942, Serial No. 463,955. Divided and this application April 22, 1943, Serial No. 483,990

12 Claims. (Cl. 35—12)

My present invention relates generally to cardboard structures, and has particular reference to a collapsible or knock-down structure intended primarily to constitute one of the elements of an educational outfit.

This application is a division of my co-pending patent application, Serial No. 463,955, filed October 30, 1942.

A general object of the educational outfit, as set forth more fully in said co-pending application, is to provide, in the form of relatively inexpensive cardboard structures, a highly effective means for simulating certain important parts of an actual airplane cockpit, and the relationships of such parts to one another, the structures being primarily intended for conjoint use and being of such relative sizes that a student will be enabled to experience some of the basic problems confronting an actual flier.

More particularly, the eductional outfit comprises structures which simulate, respectively, the instrument-panel, the wheel-control, and the rudder-pedals of an airplane cockpit; and it is contemplated that a student sitting before the instument-panel with his hands on the wheel-control and his feet on the pedals will thus be subjected to conditions simulating those which obtain in an actual cockpit. This experience, augmented by suitable instruction, either in a classroom or otherwise, enables the student not only to acquire a better understanding of the controls and instruments involved in flying an airplane, but also to experience and develop a familiarity with the coordination between instrument readings and hand and foot movements which is called for under varying conditions of actual flight.

This divisional patent application has particular reference to the wheel-control, which is so constructed and designed that a wheel element mounted at the upper end of a post portion may be grasped and rotated by the student, while the post portion itself may be subjected to forward-and-back movements, thus imparting to the student a realistic and highly effective "feel" of the corresponding manipulations that would have to be made in an actual airplane.

The wheel-control structure, like the other cardboard structures forming elements of the educational outfit, has numerous detailed features which are new and useful, not only from the standpoint of construction, but also from the standpoint of simplified and inexpensive manufacture. Among these features is a design of the wheel-control so that the use of metal and critical materials is avoided and so that the wheel element is nevertheless rotatable with a maximum of ease, and a design of the post portion of the wheel-control to permit the desired forward-and-back movements to be effected by merely abutting it against the forward edge of a chair or the like.

Moreover, the wheel-control is composed of a minimum amount of flat cardboard material, and may be so constructed as to be readily adjustable from a completely collapsed or "knocked-down" condition to an operative set-up condition, and vice versa, the manipulations required being in each case of an extremely simple nature, and the set-up structure being of unusual staunchness and durability.

I achieve the foregoing objects and advantages, especially with respect to the wheel-control, and such other objects and advantages as may hereinafter appear or be pointed out, in the manner illustratively exemplified in the accompanying drawings in which—

Figure 2 is a front elevational view of the wheel-control by itself, in set-up condition, with a portion broken away to reveal the construction beneath;

Figure 3 is a side view of the device of Figure 2;

Figure 4 is an enlarged cross-sectional view taken substantially along the line 4—4 of Figure 2;

Figure 5 is a cross-sectional view taken substantially along the line 5—5 of Figure 3; and Figure 6 is a view of the wheel-control in collapsed condition.

Figure 1:
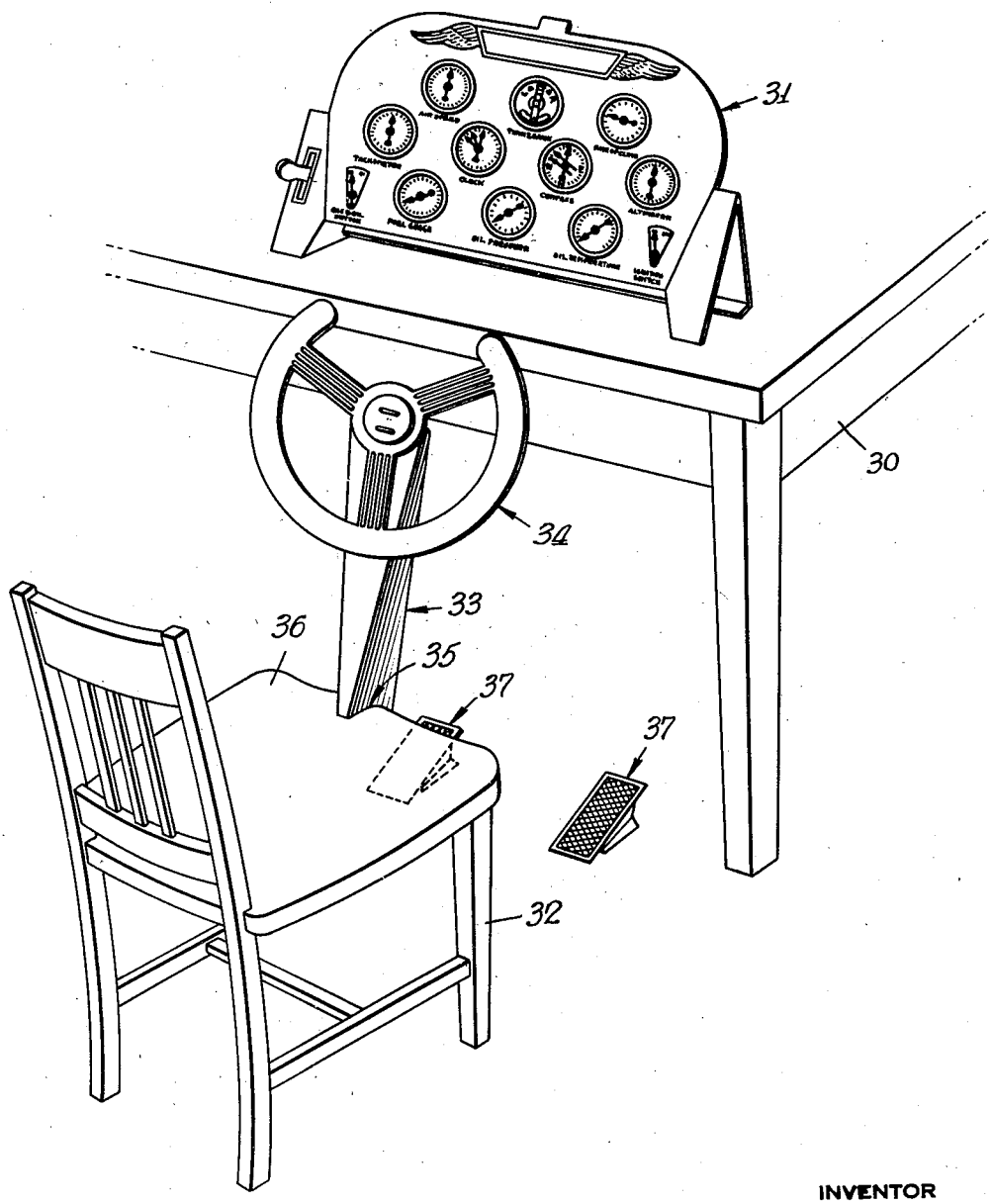
Figure 1 is a perspective vew of the elements of the educational outfit shown in set-up condition and in cooperative relationship.

While the wheel-control is a separate and independent structure useful by itself, either as a toy or as an educational device, it is contemplated that its primary utility will reside in its employment as an element of the educational outfit shown in Figure 1. It is contemplated that the structures entering into this outfit shall be utilized in the illustrative manner indicated. I have shown a table 30 upon which an instrument panel structure 31 may be set up so that the front of it is approximately at the level of the eyes of a student who would seat himself upon the chair 32. The wheel-control structure comprises a post portion 33 and a wheel element 34, the post portion having a specially shaped lower end 35 adapted to abut against the forward edge 36 of the chair 32. The rudder-pedal structures 37 would be set up on the floor in the approximate relationships shown.

The structural details of a preferred form of wheel-control are shown in Figures 2-6. The post portion of this structure comprises an element 70 formed of flat cardboard stock which is foldable longitudinally into angularly-related sections. Preferably, the element 70 is foldable into a tubular construction when it is to be set up. With this object in view, the element 70 in the preferred embodiment illustrated is provided with score lines 71 so that when the portions or sections 72 are folded in a rearward direction they will be angularly related to the front wall or section 77 and will constitute side walls of a tubular structure as indicated most clearly in Figure 5. The rear wall 73 may be of reduced dimensions, and it is preferably provided with a hinged attachment flap 74, a suitable slot 75 being provided to receive an attachment tab 76 formed on the opposite wall 72.

The front wall 77 of the post portion 33 is preferably of circular contour at its upper end to facilitate the attachment of the wheel element 34.

The wheel element 34 may be formed of a single blank of flat cardboard suitably shaped to define a peripheral grasping portion 78, spokes 79, and a hub portion 80. The portion 80 is provided with a relatively large opening at its center.

Attached to the front wall 77 of the post portion 33 is a flat circular hub element 81 adapted to fit snugly into the aperture formed in the hub portion 80 of the wheel element. The hub element 81 may be attached to the wall 77 in any desired manner and serves as a strong and efficient support for rotatably mounting the wheel element 34 to the post portion 33.

For the purpose of holding the wheel element 34 in position, a retaining element is preferably provided in the form of a flat disk 82, slightly larger than the hub element 81. The retaining element 82 is secured over the hub element 81, and a convenient procedure lies in the employment of staples 83 or equivalent fastening means which pass through the wall 77, and through the elements 81 and 82, thereby holding all of these parts in firm superposed relationship. This leaves the wheel element 34 in secure sandwiched relationship between the wall 77 and the retaining element 82, yet freely rotatable on the hub element 81.

It will be observed that the lower end of the post portion 33 is of special configuration. This configuration is brought about by providing a notch or concaved lower edge 84 on each of the side walls 72, this being preferably accomplished by an elongation to each side wall at the rear, as indicated at 85. As a result, when the structure is set up, the lower end 35 of the post portion is adapted to abut against the forward edge of a chair or the like to permit forward-and-back movements of the post portion in simulation of the corresponding movements to which an actual wheel-control may be subjected. So long as the abutment (against the chair edge) of both of the side walls 72 is maintained, lateral movements of the post portion are prevented. As a result, the student seated in the chair with the post portion between his knees and with the wheel element in his hands is enabled to perform and practice the various coordinated movements to which an actual wheel-control is subjected during the process of flight.

In general, it will be understood that the details herein described and illustrated may be modified by those skilled in the art without departing from the spirit and scope of the invention as expressed in the appended claims. It is therefore intended that these details be interpreted as illustrative and not in a limiting sense.

Having thus described my invention and illustrated its use, what I claim as new and desire to secure by Letters Patent is:

1. A cardboard structure which simulates the wheel-control of an airplane cockpit, comprising an element defining the upright post portion of the wheel-control, a wheel element, means for rotatably mounting said wheel element at the upper end of said post portion, said post portion having the lower end thereof provided with a means for engaging the forward edge of a chair or the like and holding the post portion in rocking engagement therewith.

2. A cardboard structure as set forth in claim 1, the element defining the post portion being formed of flat cardboard stock.

3. A cardboard structure as set forth in claim 1, the element defining the post portion being formed of flat cardboard stock foldable longitudinally into angularly-related sections.

4. A cardboard structure as set forth in claim 1, the element defining the post portion and the wheel element being each formed of flat cardboard stock.

5. A cardboard structure as set forth in claim 1, said wheel element being provided with a circular aperture, and said mounting means comprising a circular flat hub element carried by the post portion and adapted to fit snugly into said aperture when the wheel element is mounted thereon.

6. A knock-down cardboard structure which, when set up, simulates the wheel-control of an airplane cockpit, comprising an element formed of flat cardboard stock provided with score lines whereby it is foldable into a tubular condition in which it defines the upright post portion of the wheel-control, a wheel element formed of a flat blank of cardboard, and means for rotatably mounting said wheel element at the upper end of said post portion.

7. A knock-down cardboard structure as set forth in claim 6, said wheel element being provided with a circular aperture, and said mounting means comprising a circular flat hub element carried by the post portion and adapted to fit snugly into said aperture when the wheel element is mounted thereon.

8. A knock-down cardboard structure as set forth in claim 6, said wheel element being provided with a circular aperture, and said mounting means comprising a circular flat hub element carried by the post portion and adapted to fit snugly into said aperture when the wheel element is mounted thereon, and a retaining element for holding the wheel element on said hub element.

9. A knock-down cardboard structure as set forth in claim 6, the lower end of said post portion being shaped to abut against the forward edge of a chair or the like to permit forward-and-back movements of said post portion in simulation of the corresponding movements to which an actual wheel-control may be subjected.

10. A knock-down cardboard structure as set forth in claim 6, the lower end of said post portion comprising spaced side walls each of which has a concaved lower edge, said lower end being thereby adapted to abut against the forward edge of a chair or the like to permit forward-and-back movements of said post portion in simulation of the corresponding movements to which an actual wheel-control may be subjected, lateral movements of said post portion being avoided so long as the abutment of both of said side walls is maintained.

11. A cardboard structure which simulates the wheel-control of an airplane cockpit, comprising an element defining the upright post portion of the wheel-control, a wheel element, means for rotatably mounting said wheel element at the upper end of said post portion, and the lower end of the post portion having a notch therein to receive and to abut against the forward edge of a chair or the like to permit forward-and-back movements of said post portion in simulation of the corresponding movements to which an actual wheel-control may be subjected.

12. A cardboard structure which simulates the wheel-control of an airplane cockpit, comprising an element defining the upright post portion of the wheel-control, a wheel element, means for rotatably mounting said wheel element at the upper end of said post portion, and the lower end of the post portion having a concaved contour to abut against and to receive in said concavity the forward edge of a chair or the like to permit forward-and-back movements of said post portion in simulation of the corresponding movements to which an actual wheel-control may be subjected.

SAM GOLD.